United States Patent [19]

Withers

[11] Patent Number: 4,962,677
[45] Date of Patent: Oct. 16, 1990

[54] HARMONIC BALANCER

[76] Inventor: Graham R. Withers, 1297 Nepean Highway, Cheltenham, Victoria, Australia

[21] Appl. No.: 428,418

[22] Filed: Oct. 30, 1989

Related U.S. Application Data

[63] Continuation of Ser. No. 258,699 filed as PCT AU87/00405 on Nov. 30, 1987, published as WO88/04377 on Jun. 16, 1988, abandoned.

[30] Foreign Application Priority Data

Dec. 1, 1986 [AU] Australia .................. PH9268

[51] Int. Cl.$^5$ ............................................ F16F 15/10
[52] U.S. Cl. ..................................................... 74/574
[58] Field of Search ............. 74/574, 604; 188/218 A; 464/87, 96; 1/180

[56] References Cited

U.S. PATENT DOCUMENTS

| | | | |
|---|---|---|---|
| 1,949,520 | 3/1934 | Whisler | 74/574 |
| 1,950,886 | 3/1934 | Gunn | 74/574 |
| 2,159,235 | 5/1939 | Tyler et al. | 74/574 |
| 2,224,478 | 12/1940 | Jones | 74/574 X |
| 2,727,368 | 12/1955 | Morton | 464/89 |
| 3,058,321 | 10/1962 | Aske | 74/574 X |
| 3,113,407 | 12/1963 | Tocci-Guilbert | 464/89 |
| 3,479,907 | 11/1969 | Hall | 74/574 |
| 3,901,101 | 8/1975 | McGavery | 74/574 |
| 4,150,587 | 4/1979 | Bremer, Jr. | 74/574 |
| 4,462,270 | 7/1984 | Cooper et al. | 74/574 |

FOREIGN PATENT DOCUMENTS

| | | | |
|---|---|---|---|
| 21975 | 1/1981 | European Pat. Off. | 74/574 |
| 61-256040 | 11/1986 | Japan | 74/574 |
| 379202 | 8/1964 | Switzerland | 74/574 |
| 446548 | 5/1936 | United Kingdom | 74/574 |

Primary Examiner—Rodney M. Lindsey
Attorney, Agent, or Firm—Mason, Fenwick & Lawrence

[57] ABSTRACT

A torsional vibration damper used to dampen harmonic vibration frequencies set up in crank shafts of reciprocating internal combustion engines, the balancer having a hub section (14) to be fitted to the crank shaft requiring balancing the hub section (14) defining an outwardly directed peripheral face (15) having an annular ring (30) of elastomeric material received thereover, the balancer further having an inertia ring (13) press fitted over said elastomeric material ring (30) with an inwardly directed face (35) of said inertia ring (13) engaging said elastomeric material (30), the inertia ring (13) including an inwardly directed member (19) located at one axial end of said inertia ring (13) having a free end located at a radial distance from the axis of rotation of the shaft being balanced less than the radial distance of the peripheral face (15) of said hub section (14) from the axis of rotation, and a plastically deformable member (33) located at the other axial end of said inertia ring (13), said deformable member (33) having a free end in an undeformed state spaced from said axis of rotation, a distance no less than the radial distance between the axis of rotation and an outer surface of said elastomeric material (30), the free end of said deformable member (33) being located, in a deformed state, at a radial distance from said axis of rotation less than the radial distance of the peripheral face (15) of said hub section (14) from the axis of rotation of the balancer.

3 Claims, 2 Drawing Sheets

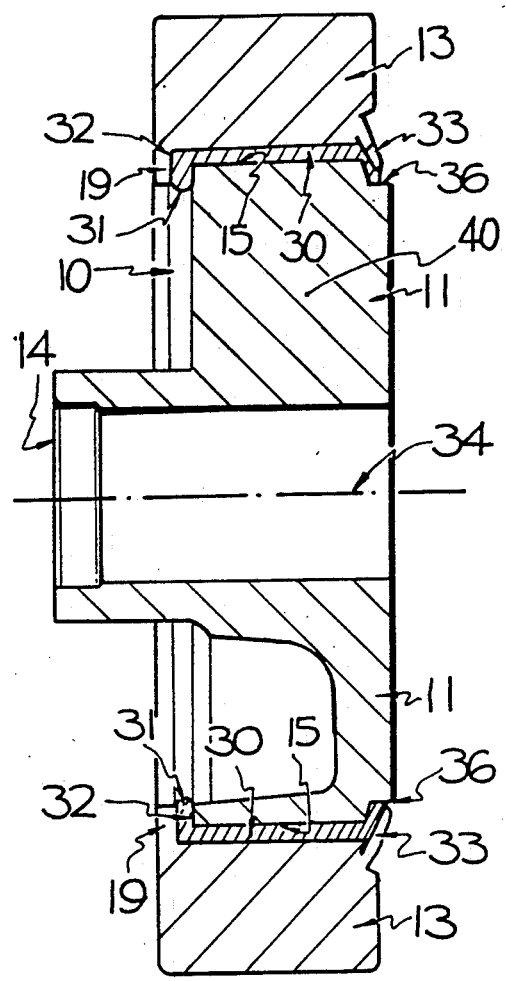
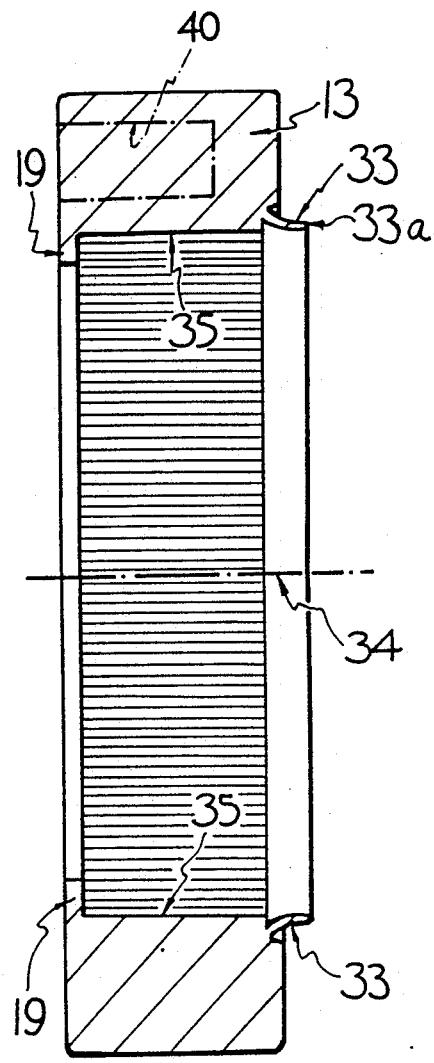
FIGURE 1
FIGURE 2

HARMONIC BALANCER

This application is a continuation, of application Ser. No. 258,699, filed as PCT AU87/00405 on Nov. 30, 1987, published as WO88/04377 on Jun. 16, 1988, now abandoned.

The present invention relates to improvement in harmonic balancers of the type used to dampen harmonic vibration frequencies set up in the crankshafts of reciprocating internal combustion engines.

Conventionally harmonic balancers (also commonly referred to as torsional vibration dampers) have comprised a hub section adapted to be connected to the crankshaft of a desired engine and defining an outer peripheral surface An annular inertia ring is located outwardly of the peripheral surface of the hub and rubber or other elastomeric ring is sandwiched between the hub section and the inertia ring. The construction thus described is held together by friction forces existing between the three parts of the construction. It is generally necessary that no metal to metal contact occurs between the inertia ring and the hub section. It has been thought that there is a danger that the inertia ring might become disengaged from the hub section particularly with high performance engines operating at high speeds. In other situations, where high vibration frequencies might exist, it is possible that the elastomeric or rubber section could degrade rapidly allowing again for release of the inertia ring from the hub section. If this did occur it will be apparent that quite dangerous situations could result. In some instances it has been proposed to bond the elastomeric material to the hub and the inertia ring. This is achieved by having usually both hub and ring located in a compression moulding die, then loading in the "raw" rubber (elastomer) and bonding the parts together. There are several disadvantages with this method:

(1) It is a very slow process, as the hub and ring have to be heated to the moulding temperature.
(2) The rubber (elastomer) shrinks as it cools, thereby reducing the compression of the rubber (elastomer) between the hub and the ring.
(3) The ring may deflect more easily, due to the lack of compression, or possibly tear away more readily
(4) If a bonded ring slips and breaks the bond, it will generally be unusable (like a broken engine mount).

There is therefore a greater risk of failure with bonded type inertia ring balancers and a greater need for positive restraining arrangements.

It is an objective therefore of the present invention to provide a harmonic balancer which is capable of performing the function of conventional harmonic balancers but which includes positive mechanical safety features which prevent the inertia ring from becoming disengaged in operational circumstances. A preferred objective of the present invention is to provide the foregoing safety features in a manner which does not significantly increase the complexity or cost of the harmonic balancer.

According to the present invention there is provided a harmonic balancer including a hub section adapted to be fitted to a rotatable shaft requiring balancing whereby the hub section rotates with said shaft about an axis of rotation, said hub section defining an outwardly directed peripheral face having an annular ring of elastomeric material received thereover, and an inertia ring press fitted over said elastomeric material ring with an inwardly directed face of said inertia ring engaging said elastomeric material, said balancer being characterized by an inwardly directed member located at or adjacent one axial end of said inertia ring having a free end located at a radial distance from the axis of rotation of said balancer less than the radial distance of the peripheral face of said hub section from the axis of rotation of the balancer, and a plastically deformable member located at or adjacent the other axial end of said inertia ring, said deformable member having a free end in an undeformed state spaced from said axis of rotation a distance no less than the radial distance between the axis of rotation and an outer surface of said elastomeric material, the free end of said deformable member being located, in a deformed state, at a radial distance from said axis of rotation less than the radial distance of the peripheral face of said hub section from the axis of rotation of the balancer.

In this manner the inwardly directed member may be positioned to positively prevent disengagement of the inertia ring in one axial direction. The deformable member, after being deformed positively prevents disengagement of the inertia ring in the opposite axial direction. In one preferred embodiment the inwardly directed member is formed integrally with the inertia ring. This, however, is not essential in that one possible variation might be to provide a separate element attachable to the inertia ring by any convenient means. Conveniently the inwardly directed member is a substantially continuous flange although again this is not necessarily essential.

In accordance with a second aspect of this invention there is provided a method of making a harmonic balancer comprising providing a hub section adapted to be fitted to a rotatable shaft requiring balancing, said hub section defining an outwardly directed peripheral face, fitting an annular ring of elastomeric material over said peripheral face, providing an inertia ring having an inwardly directed circumferential face, with an inwardly extending member located at one axial end of said inwardly directed circumferential face and a plastically deformable member located at the other end to said inwardly directed circumferential face, said deformable member having a free end in an undeformed state spaced from an axis of rotation of the hub section by a distance no less than the radial distance between said axis of rotation and an outer surface of said annular ring of elastomeric material when said annular ring of elastomeric material is received on said peripheral face of the hub section, with said deformable member in an undeformed state press fitting said inertia ring over said annular ring of elastomeric material whereby said elastomeric material is maintained in a state of elastic compression between the peripheral face of the hub section and the inwardly dIrected circumferential face of the inertia ring, and plastically deforming said deformable member such that the free end of said deformable member is located at a radial distance from said axis of rotation less than the radial distance of the peripheral face of the hub section from the axis of rotation of the balancer.

Conveniently the deformable member may be formed integrally with the inertia ring as a substantially continuous circumferentially extending flange member.

Preferred embodiments of the above described improved arrangement are described hereinafter with reference to the accompanying drawings, in which:

FIG. 1 is a diametral cross section of the assembled harmonic balancer;

FIG. 2 is a diametral cross section similar to FIG. 1 showing the inertia ring prior to assembly with the hub section and the elastomeric ring.

Figure 1A:
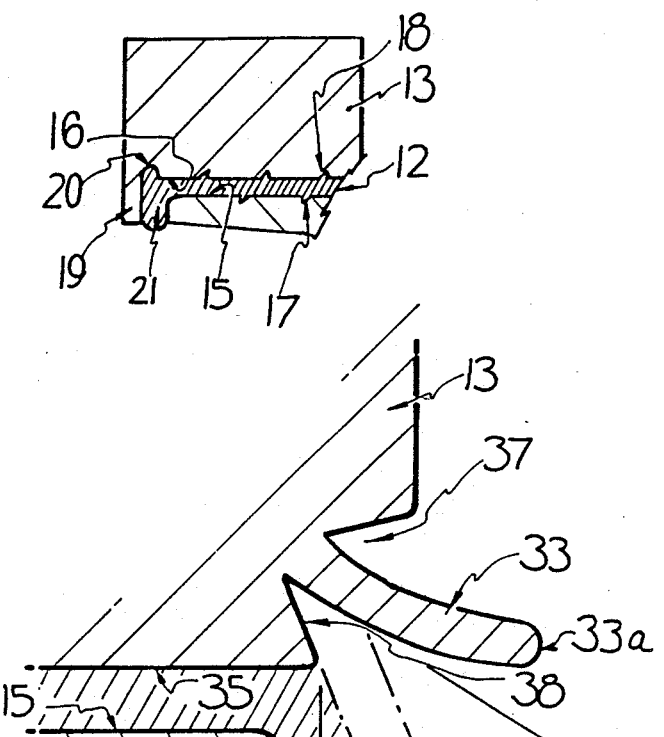
FIG. 1A is a partial cross sectional view showing alternative aspects.

As illustrated in the accompanying drawings, the harmonic balancer 10 comprises a hub section 11, an elastomeric material ring 12 and an inertia ring 13. The face 14 of the hub section is adapted to face towards the engine crank shaft to which it is attached in use. Preferably the hub section is manufactured from high tensile steel to provide improved torque driving capacity. The inertia ring is preferably produced from mild steel (or some other suitable ductile metal) to provide greater density and increased resistance to explosion under high inertia forces.

In the embodiment shown in FIGS. 1 and 2, the inertia ring 13 has an inwardly extending flange 19 at one axial end. The elastomeric ring 12 in this embodiment, is preferably preformed with a general L configuration having a main cylindrical section 30 sandwiched between the ring 13 and the hub section outer peripheral face 15. The elastomeric ring 12 also includes an inwardly directed flange 31 located between the inertia ring flange 19 and the end face 32 of the adjacent hub section.

Figure 3:
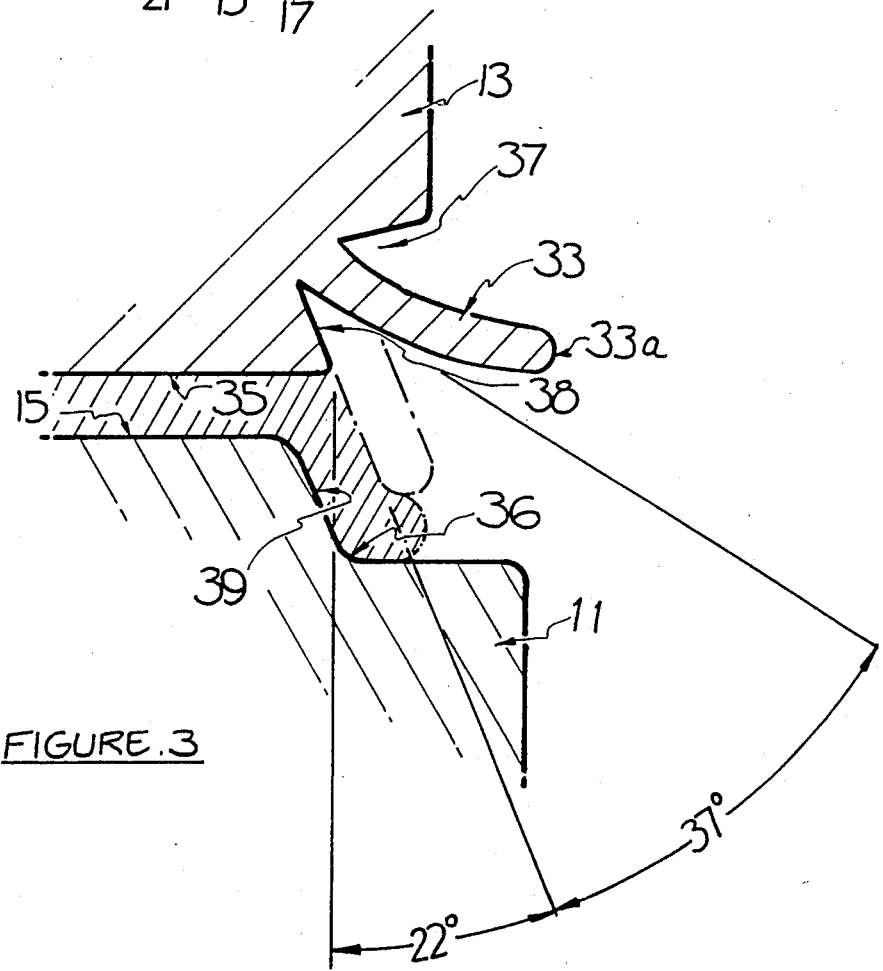
FIG. 3 is a detailed cross section ring illustrating the arrangement of the deformable restraining member.

As shown in FIGS. 2 and 3 particularly there is provided at the axial end of the Inertia ring opposite the flange 19, a second restraining member 33 The member 33 is formed as a plastically deformable encapsulating lip which in its undeformed state has a radial distance from the axis of rotation 34 no less than the inwardly facing surface 35 of the inertia ring 13. In the deformed state, the lip 33 on the front of the balancer is coined or closed over the hub 11, thus preventing the ring from moving backwards. The coining operation requires approximately 4.5 tons to close and 4.5 tons to re-open the ring. It is possible to force open the encapsulating ring 33 by pressing out the hub. The encapsulating ring 33 must be re-rolled back to original form (shape), then the hub can be re-fitted with a new rubber and closed over again. It is believed that the ring could be opened and closed a number of times, providing the correct tooling equipment and procedure is followed.

As shown in FIGS. 1 and 3 the lip 33 may conveniently be closed down over a recessed region 36 on the hub section thus forcing the end 33a of the cylindrical section 30 of the elastomeric ring down into the recessed region 36 to be sandwiched between the hub section and the inertia ring. In this manner metal to metal contact between the inertia ring 13 and the hub section 11 is prevented.

Conveniently the lip 33 is formed within a recess region 37 with a peripheral abutment surface 38 formed at an angle of about 20 to 25° to a plane normal to the axis of rotation 34. The lip 33 in the undeformed state preferably forms an angle of about 35 to 40° to the abutment surface 38 and in the closed state the lip 33 is pressed down against the abutment surface 38 generally parallel to an axially facing surface 39 of the recess 36.

The outwardly directed peripheral surface 15 of the hub section and the inwardly directed surface 35 of the inertia ring are both preferably knurled or otherwise similarly finished to increase the contact area with the elastomer material 12. This improves the resistance to slippage between the inertia ring 13 and the hub section 11 when the radial torque and/or the speed of the hub is increased or decreased rapidly In particular, it is preferred to provide a spline knurling effect or the like wherein axial extending grooves are provided in one or both of the surfaces 15, 35 to prevent slippage occurring in circumference.

FIG. 1A shows an alternative embodiment further including barbed grooves 17 and 18 provided in each of the surfaces 15 and 35 respectively. The barbed or laterally directed formation of these grooves are in each surface directed in a manner which would tend to resist axial sliding movement between the hub 11 and the ring 13.

As is shown in the FIG. 1A, an integral and continuous flange 19 is provided depending inwardly at one end face of the ring 13. The inner diameter of this flange is smaller than the outward diameter of the face 15 whereby a positive mechanical interference is established preventing removal of the ring to the right in the figure. In addition, a groove 20 may be provided between the face 16 of the inertia ring and the inwardly directed face of the flange 19. The groove 20 serves the dual purpose of assisting assembly of the three parts 11, 12 and 13 while also allowing the elastomeric material to flow into the groove (in a similar manner to the barbed grooves) which resists detachment of the inertia ring after assembly.

Finally, it will be apparent that the elastomeric material 12, at least after assembly includes a section 31 between the flange 19 and the hub section 11. This ensures that during operation there is no metal to metal contact between the hub 11 and the ring 12 which would substantially interfere with the dampening action of the balancer.

Conveniently, either the inertia ring 13 or the hub section 14 (or both) have provision for a balance weight 40. As shown in FIG. 1, the balance weight 40 may be formed by leaving an arcuate section of the hub section 14 unmachined to achieve the desired weight distribution.

I claim:

1. A torsional vibration damper, comprising:
   (a) a hub section adapted to be fitted to a rotatable shaft requiring balancing, wherein the hub section rotates with said shaft about an axis of rotation, said hub section comprising an outwardly directed peripheral face;
   (b) an annular ring of elastomeric material received over said peripheral face of said hub section;
   (c) an inertia ring press fitted over said elastomeric material ring, with an inwardly directed face of said inertia ring engaging said elastomeric material, said inertia ring having a mass sufficient to provide a significant moment of inertia when in use;
   (d) an inwardly directed member formed in one piece with, an located at or adjacent one axial end of, said inertia ring, the inwardly directed member having a free end located at a radial distance from the axis of rotation of said damper less than the radial distance of the peripheral face of said hub section from the axis of rotation of the balancer; and
   (e) a plastically deformable member integrally formed in one piece with said inertia ring, located at or adjacent the other axial end of said inertia ring, said deformable member having a free end which is constructed and adapted to be in either an undeformed state or a deformed state, wherein
      (1) when said deformable member is in said undeformed state, it is spaced from said axis of rotation a distance no less than the radial distance between the axis of rotation and an outer surface of said elastomeric material; and (2) when said deformable member is in said deformed state, the free end of said deformable member is located at a radial distance from said axis of rotation less than the radial distance of the peripheral face of said hub section from the axis of rotation of the balancer;

wherein said harmonic torsional vibration damper is constructed and adapted so that said rotatable shaft's torsional vibration is damped and said rotatable shaft is balanced.

2. A harmonic torsional vibration damper according to claim 1, wherein said elastomeric material is located between said inwardly directed member and adjacent regions of said hub section.

3. A harmonic torsional vibration damper according to claim 1, wherein said inwardly directed member is a substantially continuous flange.

* * * * *